March 7, 1967  I. E. COX  3,307,885
DUST GUARD

Filed Nov. 8, 1963  2 Sheets-Sheet 1

INVENTOR.
ISAAC E. COX

BY
Wallace, Kinzer and Dorn
ATTORNEYS

March 7, 1967   I. E. COX   3,307,885
DUST GUARD

Filed Nov. 8, 1963   2 Sheets-Sheet 2

*INVENTOR.*
ISAAC E. COX

BY
*Wallace Kinzer and Dorn*
ATTORNEYS

United States Patent Office 3,307,885
Patented Mar. 7, 1967

3,307,885
DUST GUARD
Isaac E. Cox, Kirkwood, Mo., assignor to American Brake Shoe Company, New York, N.Y., a corporation of Delaware
Filed Nov. 8, 1963, Ser. No. 322,372
4 Claims. (Cl. 308—36.1)

This invention relates to a dust guard of the type commonly employed for protecting axle bearings and gears in the truck of a diesel locomotive.

In the truck of a diesel locomotive, an axle is journaled in axle bearings and the axle supports the wheels and a driving gear for the axle. A pinion gear on a traction motor is carried on a frame portion of the diesel locomotive overlying the truck and is employed to drive the gear on the axle. Dust guards on the pinion side diesel locomotive of the type herein described are in sealing engagement with the rotatable hub of the axle gear to prevent entrance of dirt or other foreign matter into the gear and gear lubricant. On the other side of the locomotive, the commutator side, the dust guard prevents dirt and other foreign matter from entering into the bearing regions and contaminating the lubricant or causing lubrication difficulty by lodging between the axle bearings and the axle.

The present invention is directed to a separable or detachable type of dust guard which is adapted to be secured to a thrust flange of the bearing. A separable type of dust guard of the type herein employed is more advantageous than an integrally formed dust guard of the type integrally formed on a bearing in that a separable dust guard more readily facilitates assembly and disassembly of the bearings and axles and facilitates inventory problems.

The present invention is directed to the problem of preventing the loosening or losing of a dust guard cover particularly as the result of vibrating of the dust guard. The vibrating loose of a dust guard can be extremely dangerous on a locomotive since there is always a possibility of loose parts being instrumental in causing a derailment disaster. Accordingly, an object of the present invention is to afford a dust guard of the detachable type for use on a diesel locomotive of such a construction that prevents the likelihood of vibrating loose of the dust guard or the accompanying fasteners for the dust guard.

More specifically, in accordance with a further object of the invention, the dust guard has a portion that is deformed or sprung so that when the dust guard is secured on the bearing, the deformed portion is flexed from its free state and thus is biased against a retaining surface on the bearing thereby preventing vibration of the dust guard.

Specifically, in accordance with a further object of the present invention, the dust guard has an arcuate flange which is generally uniplanar except for a sprung or deflected portion on its attaching flange. Thus, when the deflected portion is forced into a groove in the thrust flange on an axle bearing, different and spaced points of the attaching flange are biased against respectively opposite side walls of the groove; and since the flange is inherently biased to attain its free state with its deflected portion out of the plane of the groove, the dust guard is prevented from vibrating.

According to a further object of the invention, the attaching flange of a dust guard is secured against circumferential displacement by fastener openings or means disposed adjacent the parting lines for the dust guard 180° sectors.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

Figure 1:
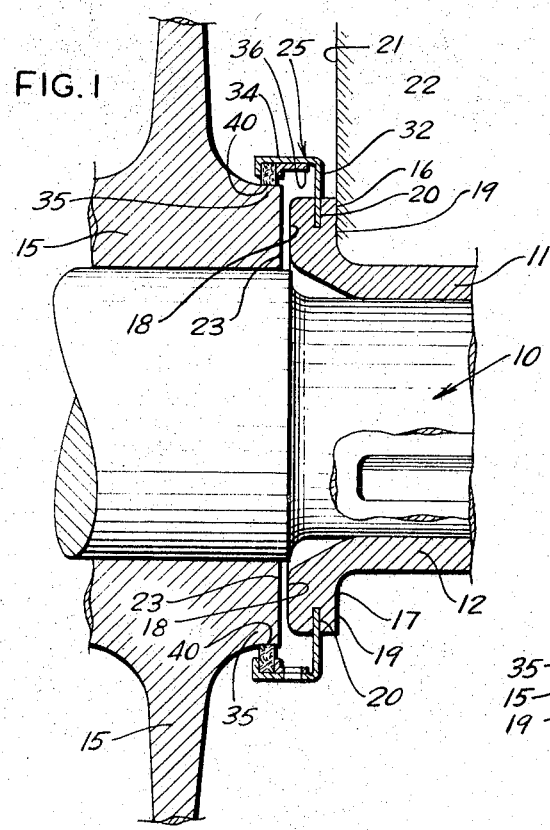
FIG. 1 is a sectional view showing an axle bearing supporting a dust guard according to the preferred embodiment of the invention.

Referring now to the drawings, and more particularly to FIG. 1, there is illustrated a portion of a locomotive diesel including an axle 10 mounted in axle bearing halfsleeves 11 and 12 in which the axle 10 rotates and drives an attached wheel 15. The wheel 15 is press-fitted or otherwise suitably attached to the axle 10 and rotates with the axle 10. The bearing half-sleeves 11 and 12 are 180° bearing elements which are joined at a parting line (not shown) which is medially disposed of the axle 10 shown in FIG. 1. The axle halves 11 and 12 have at each of their outer ends upturned thrust flanges, of which thrust flanges, 16 and 17 respectively, are shown in FIG. 1 as having thrust surfaces 18 and outer circumferential surfaces 19. The thrust surfaces 18 on the bearings cooperate with an opposed 360° thrust face 23 on the inner vertical face of the wheel 15.

Each of the outer circumferential surfaces 19 on the thrust flanges 16 and 17 is preferably formed with a circumferential slot or groove 20, which extends for 180° around each of the respective bearings to the parting line at which the slot 20 in one bearing half is aligned with the slot 20 in the other bearing half so that a 360° groove 20 is formed when the bearing halves 11 and 12 are positioned together about the axle 10. The circumferential groove 20 is in a plane which is substantially normal to the axis of the axle 10, and which is substantially parallel to the plane of the wall 21 of the traction motor housing 22, and hence parallel to the thrust surfaces 18 and 23.

Figure 2:
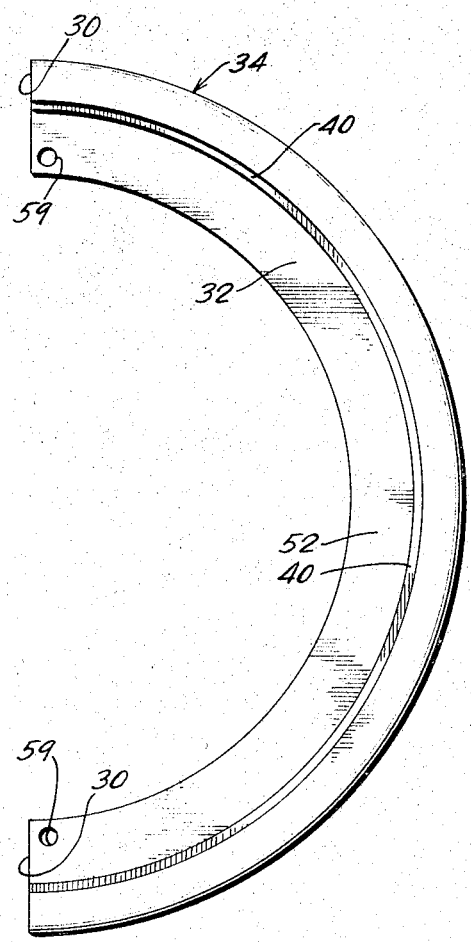
FIG. 2 is a side elevational view of a dust guard.

Lubricating oil is disposed between the inner cylindrical surfaces of the bearing halves 16 and 17 and axle and also between the opposed thrust surfaces 18 and 23. To prevent dirt and other foreign material from entering in the space between the thrust surfaces 18 and 23, a circumferential dust guard 25 is disposed about the separated thrust surfaces 18 and 23. The dust guard 25 consists of two 180° dust guard segments adapted to be mounted on the opposed bearing halves 16 and 17 and adapted to meet each other at parting faces 30, FIG. 2 to form a 360° dust guard encircling a hub 35 of the wheel 15 and the thrust surfaces 18 and 23. Each dust guard segment includes a 180° attaching flange 32 which is adapted to be seated within a groove or slot such as the groove 20.

The attaching flange 32 of the dust guard segment is formed from commercially purchased sheet stock or material that is subject to small variations within size, normally defined as tolerances. For instance, the tolerance for a sheet for the attaching flange is of the magnitude of .015. Thus, to assure that the groove 20 is of sufficient size to accommodate the maximum thickness of an attaching flange 32, the groove 20 is sized to accommodate the maximum thickness according to the largest addition of a tolerance. Hence, when a flat sheet forming the attaching flange 32 is of less width than the maximum tolerance width, it is free to move within the flange and vibrate between the respectively opposed walls of the groove 20.

The dust guard is subjected to extreme vibrations since the wheels are in direct contact with the rails, and since the attaching flange serves as a cantilever support for a semi-arcuate seal bearing collar portion 34, which is suspended at the unattached end of the attaching flange 32.

Figure 3:
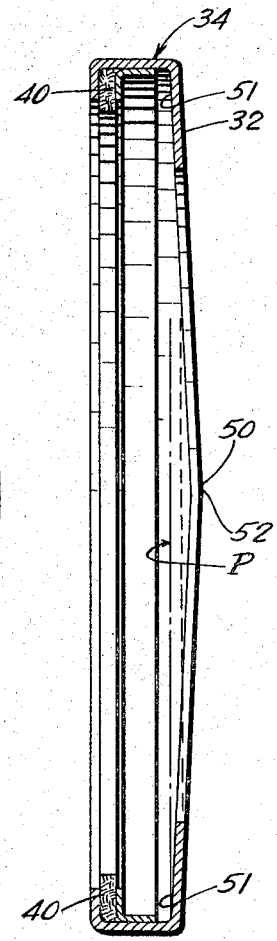
FIG. 3 is a sectional view showing the dust guard with a deflected portion on the attaching flange medially disposed on the attaching flange.
Figure 4:
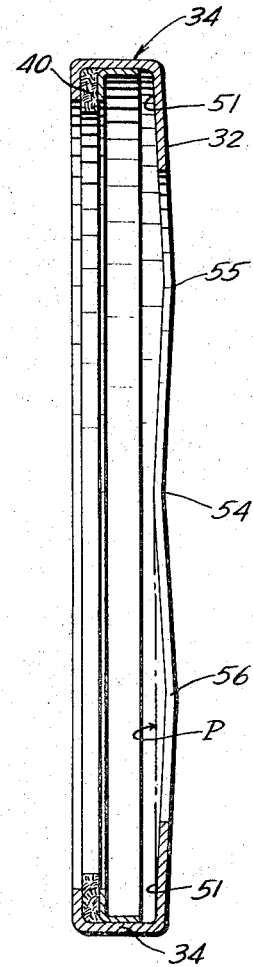
FIG. 4 is a sectional view showing another embodiment of the present invention showing a dust guard with a pair of deflected portions on its attaching flange.

The collar portion 34 is semi-circular and is normal to the plane P, FIGS. 3 and 4 of the attaching flange 32. The collar 34 is concentric to the circumferential face 19 of the thrust flanges 16 and 17 and is likewise concentric to a hub portion 35 on the wheel 15. The collar 34 extends axially outward and over the hub 35 of the wheel 15 and supports an arcuate seal retainer 36, which holds a seal of felt or the like 40 against the hub 35 of the wheel 15 to prevent the entrance of foreign material into the space between the wheel and thrust surface 18 of the bearings 11 and 12. The seal retainer 36 is an L-shaped section as shown in FIGS. 3 to 6 inclusive, with the longer leg of the L secured to the radial interface of the collar 54 as by spot welding or the like. A shorter leg 42 of the L-shaped retainer 36 extends parallel to an outer annular lip 45 defining a pocket into which is pressed the 180° section of the seal 40. The seal 40 is normally held in suitable place by a resin-type of cement. When the dust guard segments are abutted together, the ends of the seal segments 40 meet at the parting line 30, FIG. 2, and thus complete a 360° seal ring.

It will be understood by those skilled in the art that a similar sealing or dust guard is mounted at the opposite, pinion side of the bearings and serves to seal the gear and thrust bearing surfaces against the entry of dirt and other foreign matter.

The dust guard has a specially constructed attaching flange, as hereinafter described, for preventing the vibrating of the dust guard and the vibrating loose of the fasteners holding the dust guard in place. For this purpose, the attaching flange 32 has been formed in the embodiment of FIG. 3 with a deflected portion 50 which is purposely displaced or bent outwardly from the plane P shown in FIG. 3. More specifically, at the outer end portions 51 of the attaching flange 34, which portions are near the parting ends 30 of the flange 34, the portions 51 are in the plane P and extend at right angles to the collar 34. However, proceeding circumferentially from the end portions 51, attaching flange 32 is increasingly deflected outwardly from the plane P to an apex 52. Thus, from the end portions 51 in the plane P, the flange 34 has its walls diverging outwardly from the plane P to the point 52, which is central of the parting lines 30.

The deflection of the flange 32 into the configuration shown in FIG. 3 is accomplished preferably by placing a flange 32 in a coining press or the like wherein the flange 32 is subjected to a permanent deformation to the configuration shown in FIG. 3. Other methods of springing or permanently deforming the flange 32 could likewise be employed and still be within the purview of the present invention. Other shapes or configurations can be impressed in the attaching flange, for example, the double deflected portions shown in FIG. 4. Also, corrugations have been formed along the bottom edge of the attaching flange to serve as the portion to be flexed against the walls of the retaining groove and thereby prevent vibration of the dust guard.

In the embodiment of FIG. 4, end portions 51 and a central portion 54 are in the plane P, and spaced portions 55 and 56 are deflected from the plane P. Thus, as seen in FIG. 4, the attaching flange 32 diverges outwardly from the plane P at the end portion 51 to portion 55, converges inwardly to the central portion 54, diverges outwardly to the portion 56, then converges inwardly to the plane P at the end portion 51.

When either of the attaching flanges 32 is to be placed in a concentric groove or slot 20 within a thrust bearing flange 16 or 17, an end portion 51 is first placed in the groove 20 and the deflected portions of the flange 32 are then forced into the slot 20. Since the width of the slot 20 is complementary in size to the thickness of the attaching flange 32, the attaching flange 32 fits in the slot with the deflected portions 50 or 55 and 56 of the attaching flange 32 flexed from their free states, such as that shown in either FIGS. 3 or 4, to assume a generally concentric shape within the concentric and planar slot 20. This is in contrast to the conventional attaching flange which is in one plane and which can be easily slid into and from the slot 20, but which is free to move as a unit within the slot 20 as the dust guard vibrates. In contrast to an attaching flange with deflection therein, a planar flange does not have any portions thereof in a flexed condition to bear against opposite side walls in the slot to resist the vibrating or sliding of the attaching flange against one or the other of the side walls of the slot 20. The flange 32, of the present invention, with its deflected portions such as portion 50, prevents or resists vibrations since the portion 50 will be biased against and into tight engagement with one of the side walls of the slot 20 while the portions 51 will be biased against and into tight engagement with the opposite side wall of the slot 20. It is to be understood that irrespective of the particular shape of the spring or deformed portions of the flange 32 that the portions serve as a wave spring to prevent vibrations of the dust guard flange.

Figure 8:
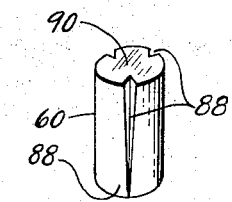
FIG. 8 is a perspective view showing a tapered fastening pin for locating the dust guard.

For the purpose of circumferentially locating and retaining in position the dust guard sections 25, each of the dust guard sections is provided with a retainer or fastener means for locating the dust guard on the thrust bearing flange 16 or 17. In the preferred embodiments, each of the dust guard flanges is provided with receiving apertures 59 located near the parting lines 30, which are adapted to receive either a tapered pin type of retainer 60, FIG. 8, or a threaded screw type fastener 61, FIG. 6. Manifestly, other types of fasteners can be employed. The pin 60 is a tapered pin the smallest diameter 88 of which is to be received in a cylindrical hole in the thrust flange 16 having a diameter to receive the smallest diameter of the tapered pin 60. Thus, as the pin 60 is driven into the hole, the pin 60 becomes deformed and wedged into the hole. Three score lines 88 on the pin 60 aid in it cutting the hole and deforming the pin 60. Manifestly, two or more such fasteners can be employed for each of the dust guard sections, although two have been found to be adequate when employing the present dust guard section and when employed near the parting lines.

The loss of a fastener such as a roll pin 60 or threaded fastener 61 is preferably prevented by having the fastener blocked against axial sliding movement by the surface 21 traction motor housing 22. Thus, with the bearing 11 or 12 with its attached dust guard section abutted against the traction motor housing 22, the fasteners are prevented from escaping and loosening due to vibrations.

Figure 6:
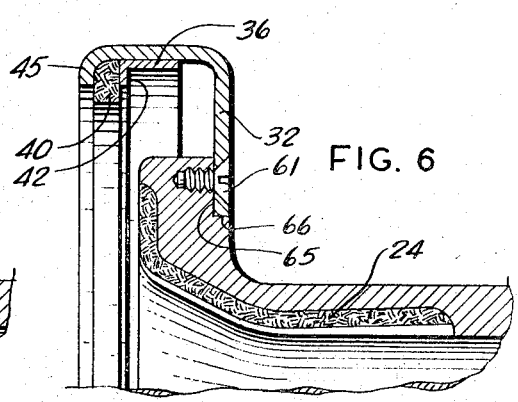
FIG. 6 is a sectional view showing another embodiment of the invention showing the dust guard secured on a shoulder by a threaded type fastener, according to another embodiment of the invention.

The dust guard employing a flange 32 with deflected portions such as 50 thereon, can be advantageously employed on a shoulder formed by a side wall surface 65, FIG. 6, and a lower wall surface 66 on the thrust flanges 16 and 17. Thus, either of the sprung type attaching flanges shown in FIG. 3 or FIG. 4 is placed on these shoulders and is attached by screw type fasteners 61, as shown in FIG. 6. When the flange is placed on a shoulder, the deflected portion is engaging the traction housing wall 21 and is flexed between the walls 21 and 65 to a state wherein the flange 34 is inherently biased to attempt to regain its free state. That is, when the flange 32 is abutted against the traction housing 22, the deflected portions on the flange 32 are straightened further into the plane P and are biased between surface 65 of the bearing and against surface 21 of the traction motor housing 22 thereby preventing vibration of the dust guard section.

While the circumferential locating means has been shown in the form of separate fasteners 60 and 61, embossed projections may be on the attaching flange 32 to serve as locating means to be aligned within the receiving openings in the bearings, so as to circumferentially locate and retain the dust guard sections relative to the bearing flanges without the need of separate and distinct fasteners such as roll pins 60 or screw type fasteners 61.

Figure 7:
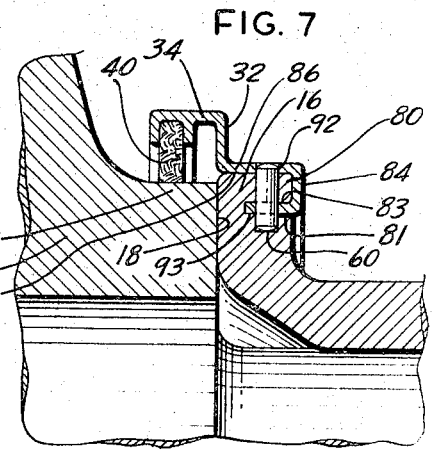
FIG. 7 is a sectional view of another embodiment of the invention showing the dust guard secured to the thrust flange of the bearing.
Figure 5:
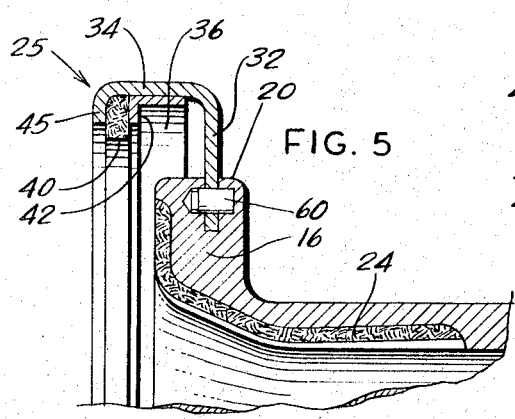
FIG. 5 is a sectional view showing fasteners for holding the dust guard within the groove of a thrust flange of an axle bearing.

Heretofore, in the embodiments described, the attaching flange 32 has been located in a radially oriented groove 20 or shoulder 65, 66, whereas in the embodiment shown in FIG. 7 the attaching flange 32 has been formed with a number of right-angle bends to form a bight to clamp about an axially extending, annular lip 80 on the thrust flange 16. More specifically, an axial oriented groove 81 extends from the inner wall of the thrust flange 16 toward the opposite thrust surface 18 to form the lip 80. The groove 81 receives an axially directed end 83 of the attaching flange 32. The end 83 leads to an upwardly extending and radially directed portion 84 of the flange 32 and this portion 84 leads to an arcuate ring 86 bent into engagement with the circumferential surface 19 of the thrust flange 16. The attaching flange 32 in this embodiment is similar to the other embodiments in that the attaching flange supports at its outer end an annular collar 34 in which is disposed a 180° felt dust guard seal 40 for engagement with the hub 35 of the wheel 15.

For the purpose of preventing vibrations of the dust guard section, shown in FIG. 7, the ring portion 86 and end portion 83 of the flange 32 are disposed in their free state to have a bight therebetween of less than the width of the lips 80 of the flange 16 whereby when the ring 86 is pressed on the circumferential surface 19, and end portion 83 is forced into the horizontal groove 81, the portions 86 and 83 of the flange 32 are biased to clamp the lip 80 in the bight therebetween. Thus, the outer annular ring 86 is biased into tight engagement with the circumferential surface 19 of the thrust flange 16 and the end portion 83 is biased into tight engagement against the upper wall of the groove 81. When the annular lip 80 of the thrust flange is being clamped by the dust guard flange due to the end portion 83 being moved away from its free state position, the dust guard section is prevented from vibrating.

To prevent circumferentially shifting of the dust guard sections, each of the dust guard sections is pinned or impaled to a bearing. Specifically, each of the dust guard sections is provided with receiving slots for a tapered pin 60 so that when the tapered pin is driven into the circular receiving slot therefor, the upper portion 90 becomes deformed and assumes a tight grip within the receiving holes therefor in the thrust flange. Rather than being axially disposed as in the other embodiments, the pin 60 in the embodiment of FIG. 7 is radially directed to be forced into a radial aperture 92 in the thrust flange 16 and through aligned aperture 93 in the annular portion 86 and end portion 83 of the flange 32. Thus, the dust guard section is held against rotational movement relative to the thrust flange 16 by the pins 60.

From the foregoing, it will be seen that when a portion of the attaching flange is biased against the dust guard due to deflecting a portion thereof from its free state that the dust guard is prevented from vibrating. In one embodiment a portion of attaching flange 32 is forced within a receiving slot so that the attaching flange 32 is flexed from its free state, such as FIG. 3 or FIG. 4, to generally conform to a planar shape fitted within the uniplanar slot 20. Since spaced and different portions of the flange 32 are biased into engagement with the side walls of the slot 20, the dust guard is prevented from vibrating. Also, when placed in slots 20, the dust guard sections are concentric with the hub 35 of a wheel 15 so that the felt seal 40 is concentric to the hub and is in uniformly tight engagement with the surface of a hub. In the embodiment of FIG. 7, the end 83 of the flange 32 is flexed further open from its free state when forced into the groove 81, whereupon the end and annular portions 83 and 86 are biased to clamp against the lip 80 of the thrust flange.

Hence, while preferred embodiments of the invention have been described and illustrated, it is to be understood that these are capable of variation and modification, and I therefore do not wish to be limited to the precise details set forth, but desire to avail myself of such changes and alterations as fall within the purview of the following claims.

I claim:

1. The combination of a dust guard and a bearing, said bearing having a main cylindrical bearing surface and an integral and upstanding arcuate thrust flange at one end of said bearing, said thrust flange having a thrust bearing surface, said thrust flange having a groove formed therein extending in an arcuate manner in said thrust flange, said groove being bounded by opposed side walls spaced apart a predetermined distance, said dust guard having an arcuate collar, sealing means carried by said arcuate collar, and an attaching flange secured to said arcuate collar, said attaching flange being of a cross-sectional thickness to fit in said recess means between said side walls, said attaching flange being flexible and having a portion flexed and biased against at least one of said side walls to suppress the vibration of said attaching flange in said groove, and means for securing said attaching flange to said thrust flange of said bearing.

2. The combination of claim 1 wherein said bearing is a half sleeve bearing having a 180° main cylindrical bearing surface and 180° thrust bearing surface, and wherein said groove extends in a continuous manner for 180° about said thrust flange.

3. The combination of claim 2, wherein said groove is in a predetermined plane and wherein said flexible attaching flange is in approximately the same plane as said predetermined plane when disposed in said groove, said flexed portion of said attaching flange being inherently biased to a position out of the plane of the remainder of the attaching flange when said attaching flange is removed from said groove.

4. In a 180° dust guard having an arcuate semi-circular attaching flange for disposition in a groove in an annular thrust flange of a bearing, and having a seal-supporting colar projecting from the attaching flange: said collar being of semi-circular form extended in a plane substantially normal to a predetermined plane and presenting a semi-circular seal at the forward end thereof, said arcuate attaching flange being joined to the opposite end of said collar substantially at the intersection of said plane with said collar, and said attaching flange in a portion thereof radially inward of said intersection being bent slightly out of said plane, said bent portion being flexible to move to approximate said predetermined plane when disposed in said groove in said bearing to suppress vibration of said attaching flange in said groove, and locating means on said attaching flange at spaced locations for locating said attaching flange relative to said bearing.

References Cited by the Examiner

UNITED STATES PATENTS

| | | | |
|---|---|---|---|
| 1,300,294 | 4/1919 | Pribil | 308—36.1 |
| 1,300,507 | 4/1919 | Storker | 308—36.1 |
| 1,337,597 | 4/1920 | Gibert | 308—187.2 |
| 1,464,393 | 7/1923 | Page | 308—187.1 X |
| 1,801,655 | 4/1931 | Brown | 308—187.2 |
| 1,888,215 | 11/1932 | Bott | 308—187.2 |
| 1,915,058 | 6/1933 | French | 308—187.1 |
| 1,916,682 | 7/1933 | Ovestrud | 308—187.1 |
| 1,918,121 | 7/1933 | Mulhern | 308—187.1 X |
| 2,054,581 | 9/1936 | Delaval | 308—187.1 |
| 2,189,197 | 2/1940 | Cerny | 308—187.1 |
| 2,224,704 | 12/1940 | Stein | 308—187.2 X |
| 2,261,409 | 11/1941 | Peo | 277—189 X |
| 2,699,366 | 1/1955 | Heinrich | 308—187.2 |
| 2,755,113 | 7/1956 | Baumheckel | 308—187.1 |
| 2,890,084 | 6/1959 | Klingler | 308—80 |
| 2,936,933 | 5/1960 | Malec | 277—178 X |
| 3,127,222 | 3/1964 | Hanson | 308—36.1 |
| 3,245,235 | 4/1966 | Sikora | 308—187.1 |

FOREIGN PATENTS

| | | |
|---|---|---|
| 929,597 | 12/1947 | France. |
| 919,370 | 2/1963 | Great Britain. |

MARTIN P. SCHWADRON, *Primary Examiner.*

DAVID J. WILLIAMOWSKY, *Examiner.*

L. L. JOHNSON, *Assistant Examiner.*